US005514314A

United States Patent [19]
McDougal

[11] Patent Number: 5,514,314
[45] Date of Patent: May 7, 1996

[54] SPARK PLUG AND METHOD

[76] Inventor: John A. McDougal, 14388 Harbor Island, Detroit, Mich. 48215

[21] Appl. No.: 837,256

[22] Filed: Feb. 14, 1992

Related U.S. Application Data

[62] Division of Ser. No. 671,040, Mar. 18, 1991, Pat. No. 5,210,458, which is a continuation of Ser. No. 320,107, Mar. 6, 1989, abandoned.

[51] Int. Cl.[6] .......... C04B 37/02

[52] U.S. Cl. .......... 264/61; 264/62; 264/570; 264/314

[58] Field of Search .......... 264/61, 62, 570, 264/314

[56] References Cited

U.S. PATENT DOCUMENTS

| | | | |
|---|---|---|---|
| 1,290,121 | 1/1919 | Donat | 313/236 |
| 1,364,262 | 1/1921 | Faber | 313/143 |
| 1,568,621 | 1/1926 | Rabezzana | 313/141 |
| 2,118,795 | 5/1938 | Littleton | 313/141 |
| 3,866,074 | 2/1975 | Smith | 313/118 |
| 4,097,977 | 7/1978 | Pollner | 264/61 |
| 4,161,937 | 7/1979 | Gerry | 313/153 |
| 4,329,615 | 5/1982 | Tanaka et al. | 313/141 |
| 4,402,036 | 8/1983 | Hensley | 361/257 |
| 4,440,706 | 3/1984 | Hoffman | 264/61 |
| 4,511,524 | 4/1985 | Nemeth | 264/61 |
| 4,514,657 | 4/1985 | Igashira et al. | 313/130 |
| 4,549,114 | 10/1985 | Herden | 315/58 |
| 4,677,960 | 7/1987 | Ward | 123/598 |
| 4,766,855 | 8/1988 | Tozzi | 123/143 |

FOREIGN PATENT DOCUMENTS

| | | |
|---|---|---|
| 0225713 | 6/1987 | European Pat. Off. . |
| 1026595 | 4/1953 | France . |
| 61972 | 6/1955 | France . |
| 505085 | 4/1939 | United Kingdom . |
| 2199075 | 6/1988 | United Kingdom . |

OTHER PUBLICATIONS

R. Teets & J. Sell, "Calorimetry of Ignition Sparks", Society of Automotive Engineers, Inc., 1988, No. 880204.

R. Anderson & J. Asik, "Lean Air–Fuel Ignition System Comparison in a Fast–Burn Engine", Society of Automotive Engineers, Inc. 1985, No. 850076.

J. Lawton & F. Weinberg, "Electrical Aspects of Combustion", Clarendon Press–Oxford, 1969, pp. 82–83, 88–89, 308–311.

F. Saunders, "A Survey of Physics for College Students", 1936, pp. 460–463.

*Primary Examiner*—James Derrington
*Attorney, Agent, or Firm*—Harness Dickey & Pierce

[57] ABSTRACT

A spark plug with integral electrical components for producing a spark with an increased size and a larger resulting flame kernel in an internal combustion engine. One or more coils may be built into the spark plug for creating a magnetic field in the vicinity of the spark. This magnetic field has the effect of bending and rotating the spark in a circular motion. Also, a capacitor may be incorporated into the spark plug to increase the intensity of the spark. A method of producing such a spark plug utilizes a cermet ink applied to the ceramic spark plug insulator before the insulator is completely hardened. The cermet ink may be used to create monolithic spark plug electrodes, integrated coils and integrated capacitors. The method may also be used to crease monolithic electrically conductive paths through any solid dielectric material.

15 Claims, 9 Drawing Sheets

FIG. 3.
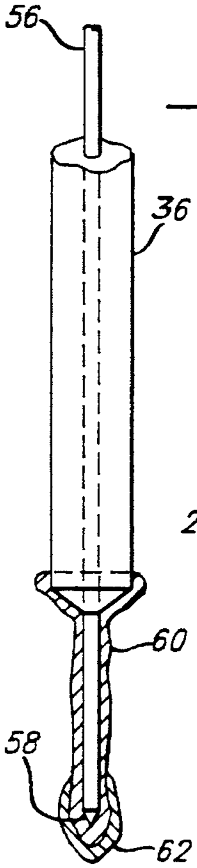
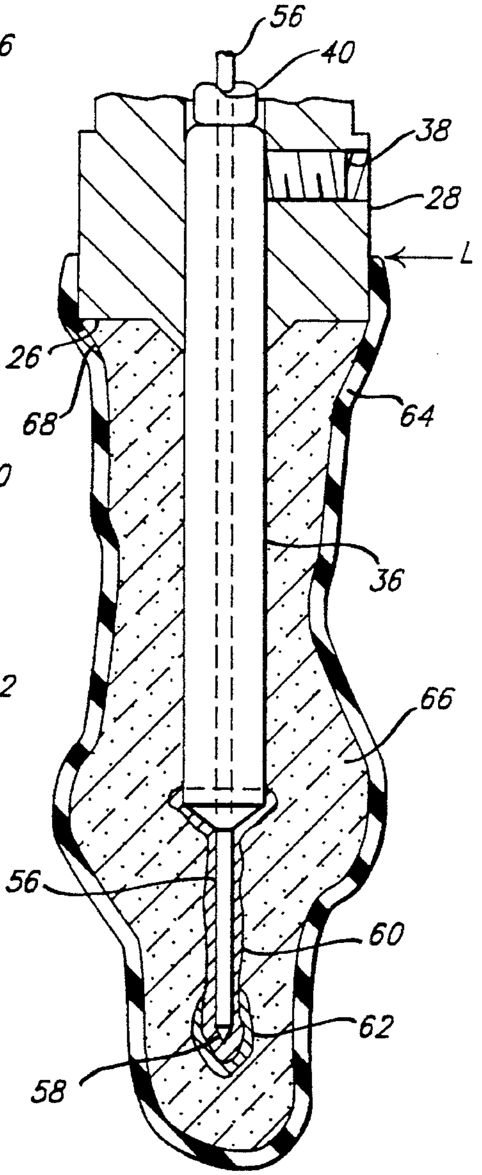
FIG. 4.
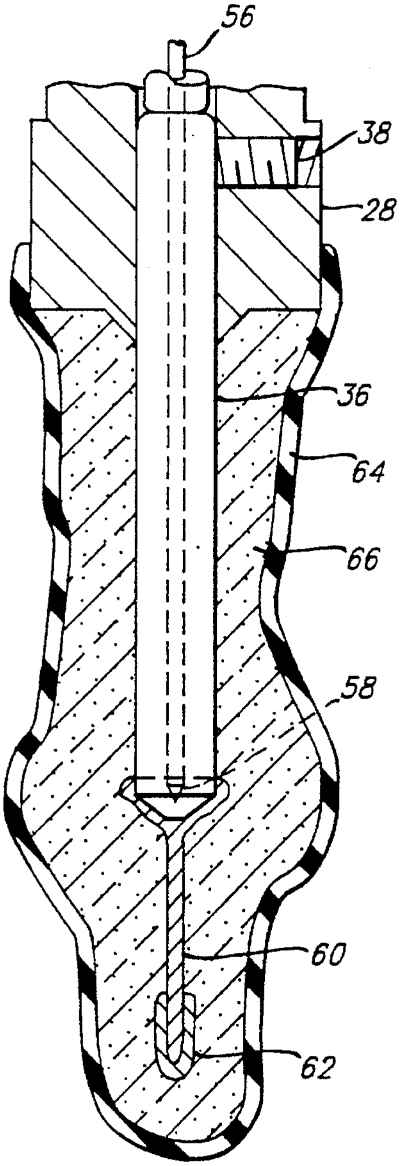
FIG. 5.

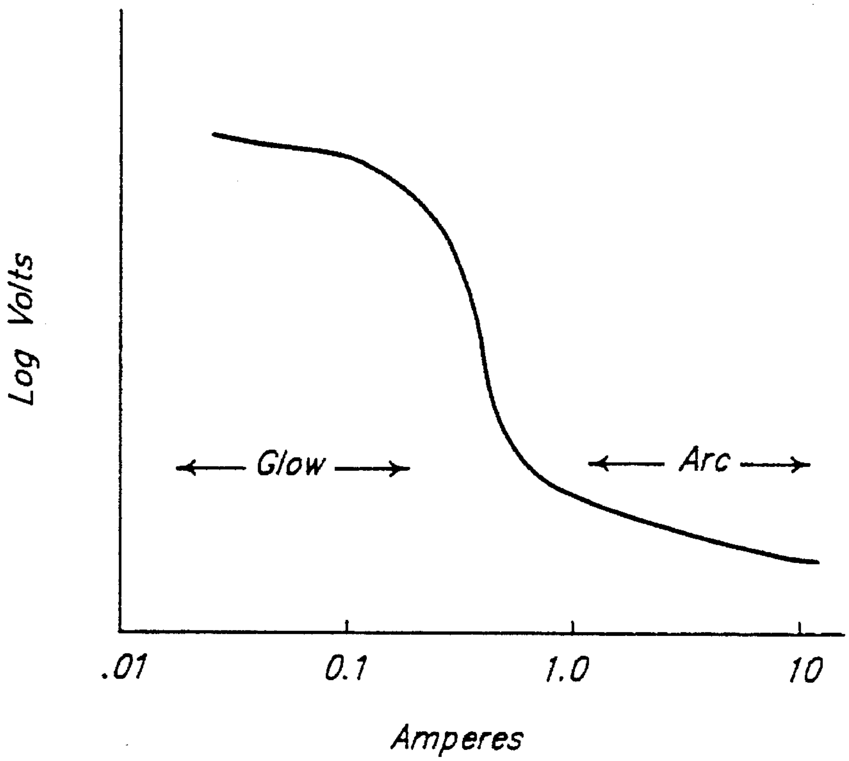
FIG. 12.
FIG. 13.
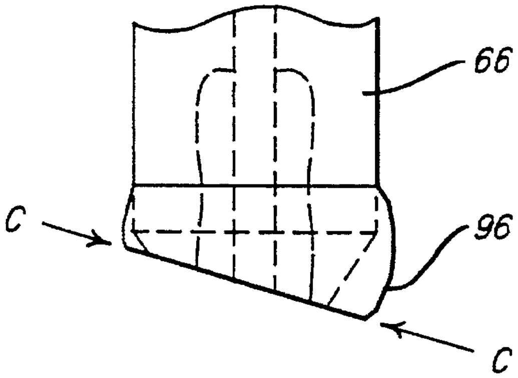
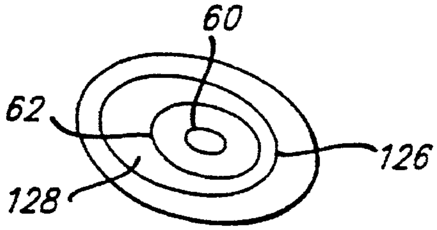
FIG. 14.

SPARK PLUG AND METHOD

This is a division of U.S. patent application Ser. No. 07/671,040, filed Mar. 18, 1991, now U.S. Pat. No. 5,210, 458 which is a continuation of U.S. patent application Ser. No. 07/320,107 filed Mar. 6, 1989, now abandoned.

BACKGROUND AND SUMMARY OF THE INVENTION

In spark ignited internal combustion engines, the combustion process normally exhibits cycle-to-cycle variability. This variability is known to result in such undesirable effects as engine roughness at idle and reduced engine efficiency at higher loads. Efficiency is reduced when peak combustion chamber pressure occurs at varying rotational locations on the crank circle.

Ignition delay variability is a major cause of cycle-to-cycle variations in combustion processes. Ignition delay is the time period between spark discharge and a measurable increase in combustion chamber pressure attributable to combustion. This time period varies because of chaotic processes within the combustion chamber within the vicinity of the spark plug. These chaotic variations result from small scale mixture turbulence as well as small scale variations in mixture composition. As a result, from one combustion cycle to the next, the speed at which the combustion proceeds will appreciably vary, because variations in the turbulence and mixture composition near the spark plug gap will alter the speed with which the spark ignited flame kernel grows to a size which can influence the combustion chamber pressure.

One way to reduce variability in ignition delay is to increase the size of the spark. A larger spark will encompass a larger portion of the turbulent mixture and will tend to counteract some of the cycle-to-cycle mixture variability. The overall time of ignition delay will also be reduced with a larger spark. Since a conventional spark is commonly 0.030 to 0.040 inches long (e.g., the size of the spark plug gap), the initial flame kernel ignited by this spark is quite small. The surface area of this generally spherical flame kernel will grow as the square of the diameter of the sphere. Thus, the surface area of the kernel will start out small but will begin to grow rapidly in an exponential fashion as its diameter increases. It follows that if the initial flame kernel is significantly larger, then the time it takes for the flame kernel to measurably affect combustion pressure will be reduced, and the total ignition delay time will be shortened. In sum, variability in ignition delay can be reduced by a larger spark because small scale variations in fuel mixture composition will have less of an effect on a larger initial flame kernel, and overall ignition delay time will be reduced. A larger initial spark will result in a smoother running engine and will increase engine efficiency because peak combustion chamber pressure will occur at more consistent locations on the crank circle.

Various ways of increasing the size of the spark are known. Simply increasing the size of the spark plug gap is one method. However, the ignition system must be capable of providing sufficient voltage to fire the larger gap. Thus, if the spark gap is simply increased in a conventional ignition system the increased voltage requirement may cause the engine to miss, especially at high rpms.

Another method of increasing the size of the spark is taught in U.S. Pat. No. 4,677,960. That invention teaches a magnetic field which moves the spark outward into the air/fuel mixture. This configuration utilizes the circuit comprising two parallel electrodes and the spark itself as a single turn solenoid or coil which produces a magnetic field. The spark will move to a lower energy condition, enlarging the area within the coil, to slightly reduce the flux density within the single turn loop. As a result, the length of the spark is increased from the linear distance between the two electrodes, to an arc shaped spark connecting the two electrodes. The effect on the flame kernel size, however, will be minimal. Based on the shape and strength of the magnetic field produced in this manner, it can be expected that the length of this spark will probably increase by less than a factor of two. Thus, simply bending the spark by means of a magnetic field will not have a major effect on the size of the spark and ultimately the cycle-to-cycle variability of ignition delay.

The present invention provides a spark plug which significantly increases the mixture volume traversed by the spark and thereby reduces cycle-to-cycle variability in ignition delay. It does this by incorporating a multiple turn coil or solenoid into the spark plug near the area of the spark gap. This solenoid creates a magnetic field which causes the spark to bend outward and also to rotate about the center electrode. As the rotating spark sweeps around in a circular path, the resulting spark will traverse a volume of the mixture which is perhaps an order of magnitude greater than the spark in a conventional spark plug.

The actual surface area of the resulting spark path will be a function of the strength of the magnetic field, the angular speed with which the spark rotates about the center electrode and the current and duration of the spark discharge. A number of embodiments of the present invention are herein disclosed which provide various means for maximizing parameters and which result in an increase in the effective size of the spark. This has the effect of reducing cycle-to-cycle variability in ignition delay. Further, the more consistent location of peak combustion pressure on the crank circuit results in more efficient engine operation. An additional benefit of the present invention is that the engine will be able to run on leaner mixtures because the greater mixture volume traversed by the spark has an increased probability of comprising a combustible mixture among the small scale mixture nonuniformities.

In one form of this invention, a spark plug has a center high voltage electrode and an annular ground electrode concentric with, and surrounding the high voltage electrode. Also, an axial multiple turn solenoid surrounds the high voltage electrode near the spark gap. This solenoid carries current from the annular ground electrode to a conventional steel spark plug shell which is an electrical connection to ground. The solenoid creates a magnetic field perpendicular to the plane of the spark gap. This magnetic field has a steep intensity gradient that causes the spark to be bent outward from the gap plane. This happens because the spark is itself a current carrying conductor and will tend to move to a lower energy condition which is in the direction of the lesser intensity of the magnetic field. In addition, the magnetic force acting upon the spark will cause the spark to rotate about the high voltage electrode similar to the rotation of the spoke of a wheel. In completing one revolution, the spark will trace a shape similar to that of half of a circular torus, or donut, which has been sliced in the middle in a horizontal plane. Assuming one complete revolution, the total surface area of the half torus spark will be approximately $S=pi^2RD$; where D is the distance between the two electrodes and R equals the radius of the high voltage electrode plus ½D.

In another exemplary spark plug according to the present invention, a further enhancement of the magnetic field strength is achieved by the addition of a second coil or solenoid attached on one end to the high voltage electrode. The other end of the second solenoid is attached to the ignition wire. Consequently, ignition current passes through the second solenoid before it reaches the high voltage electrode. The magnetic field created by the second coil adds to the field produced by the first solenoid. As a result, the bending and the rotation of the spark is enhanced. The second coil connected to the high voltage electrode may be employed with or without the first coil connected to the ground electrode.

In yet another exemplary embodiment, the gap plane formed by the exposed surfaces of the high voltage and the ground electrodes is angled rather than perpendicular to the axis of the high voltage electrode. In this configuration, the gap distance is shorter on one side of the ground electrode than on the opposite side, due to the incline of the gap plane in the conical insulator section. As a result, the spark will initiate at the side with the shortest gap distance. This permits a lower sparking voltage to be utilized because the gap is smaller. Because of the well-known nonlinear impedance characteristic of a spark gap, once the spark has been initiated across the narrower portion, a lower voltage can sustain the spark across a wider portion of the gap as the spark is rotated by the magnetic field. The angled gap thus has the advantage of requiring a lower ignition voltage.

In yet another exemplary embodiment, a magnetic core may be inserted within the second coil. This magnetic core may be composed of a rod of magnetic material such as ferrite which is coated with an insulator. The purpose of the core is to further increase the strength of the magnetic field which is acting upon the spark.

In another embodiment of this invention, a capacitor is integrated into the spark plug. This capacitor is connected electrically between the high voltage electrode and ground. This capacitor has the effect of increasing the intensity of the initial spark discharge to thereby produce a larger initial flame kernel. Ignition systems employing a capacitor for this purpose are sometimes known as "blast wave" systems and are described in S.A.E. papers Nos. 850076 and 880224. Prior systems, however, employ a capacitor mounted externally to the spark plug. The present invention provides a capacitor which is monolithically built into the spark plug and the closer proximity of the capacitor to the spark increases the speed and initial intensity of its discharge.

Each of the above embodiments presents manufacturing difficulties that have not been overcome using conventional techniques for manufacturing spark plugs. To effectively utilize the various electrical components, such as coils and capacitors, required by these embodiments, involves more than merely attaching these components to a conventional spark plug. This is because these components must be in close proximity to the spark to be effective and therefore they are preferably integrated into the spark plug itself. To achieve this integration, techniques are taught for manufacturing these electrical components and the spark plug insulator as a single monolithic unit.

Generally, according to the present invention, the technique employed for integrating electrical components into a spark plug comprises a method for establishing electrically conductive monolithic paths through a solid by the use of a conductive ink. In particular, the method utilizes a cermet ink for creating conductive paths inside a solid insulating material such as a ceramic. The cermet ink is applied to the ceramic material at an early manufacturing stage when the ceramic is in a "green" state. This permits the ceramic insulator material to be co-fired with the cermet ink.

The cermet ink can be applied in patterns as desired depending on the desired electrical function. For example, to create a solenoid, a band of ink may be applied in a helical pattern around a cylindrical shaped portion of a green ceramic base. Additional layers of ceramic may then be applied over the coil to provide electrical insulation. To create a capacitor, a surface of cermet is first applied to a ceramic base. Insulating ceramic then may be applied over the first surface and a second surface of cermet may be applied which is parallel to the first. The resulting device, whether a capacitor or coil, may then be connected electrically to another component or wire by providing an inked surface at the terminal ends of the pattern which are suitable for such connections. In the context of this invention, the words "cermet ink" may mean any suitable fluid having an electrically conductive constituent and which is capable of forming an electrical conductor through a solid insulator materials. In one example according to the present invention, the cermet ink comprises a ceramic and a metal suspended in a solvent.

These methods may also be successfully employed to manufacture spark plug electrodes. To manufacture the high voltage electrode, the cermet or other suitable ink is applied to a thin metal wire or spindle. This cermet coated spindle is then inserted into granulated ceramic material contained in a conventional rubber mold, such as the type used in the manufacturing of ceramic spark plug insulators and pressure is applied to the exterior of the mold. Because of the porous nature of the ceramic, the applied pressure causes the cermet ink coating the spindle to bond to the ceramic with a much stronger bond than the adhesive bond which initially held the ink to the spindle.

The spindle may then be carefully withdrawn from the ceramic material. As the spindle is withdrawn, the ink slides off the spindle and the hole left below the point of the spindle is filled in as the ink and ceramic material collapse due to the compressive forces maintained on the rubber mold. After the spindle is withdrawn, additional pressure is applied to further compact the ceramic body and the embedded cermet ink. This results in a strand of cermet ink running through the ceramic insulator which creates an electrically conductive path integrated into the insulator itself. The upper portion of the solid, high voltage electrode thus formed may then make direct contact with an ignition wire, preferably in a counterbore built into the upper insulator for receiving the wire. A small lower portion of the high voltage electrode may be coated with a platinum cermet which itself forms the high voltage electrode sparking surface.

In another embodiment of the present invention, a method for creating a ground electrode is disclosed which is similar to the above methods except that the conductive ink may be applied by dipping a small conical portion of the ceramic spark plug insulator tip into the ink. This method is particularly well suited to creating an annularly shaped ground electrode, such as the one which may be used in some of the above embodiments of this invention. In this method, the conical pointed lower tip of a ceramic insulator having an axial cermet high voltage electrode, in the "green" stage, is dipped into the cermet ink. After the insulator is fired, the tip of the cone is ground away by pressing it vertically on a horizontal grinding surface. This results in exposing an annularly shaped spark gap and ground electrode surface surrounding the high voltage electrode in the gap plane. Given a particular high voltage electrode, the gap distance will depend on the diameter of the insulator at the surface of the gap plane. By using an insulator with a small conical lower portion, the gap distance can be easily adjusted during manufacturing by varying the amount of material ground away from the insulator tip. The ground electrode may then be connected electrically to a conventional steel spark plug shell and hence to electrical ground, by means of a path of inked cermet connected to the ground electrode and to the spark plug shell bottom gasket.

The above method of forming conductive paths through solid materials has the advantages of being relatively simple and cost effective to perform, and is readily adapted to mass production techniques. Moreover, by creating conductive paths which are integral with the solid, the overall reliability of the resulting device is improved because one integrated mass is employed rather than a set of discrete components. As a result, such a device can withstand large temperature extremes because there are fewer separate components having different coefficients of expansion. With respect to the manufacture of spark plugs, a further advantage of the above techniques is that they make it possible to integrate various electrical components, such a conductors, coils and capacitors, into the spark plug itself. This greatly facilitates the creation of a spark plug having a magnetic field in the area of the spark gap, as is requided by some of the embodiments of the present invention.

BRIEF DESCRIPTION OF THE DRAWINGS

FIG. 3 is a view of the lower portion of the center electrode spindle assembly with a second coating of cermet ink applied, according to the method of the present invention.

FIG. 4 is a cross-sectional view of the center electrode spindle assembly and the lower portion of the butt die showing the center electrode spindle assembly surrounded by a partially pressed ceramic blank which has been formed within an isostatic molding cavity.

FIG. 5 is a cross-sectional view of the center electrode spindle assembly and the lower portion of the butt die showing the partially pressed ceramic insulator after the center electrode spindle assembly has been partially withdrawn from the ceramic insulator leaving a strand of cermet inside the insulator.

FIG. 12 is a graph illustrating the nonlinear impedance characteristic of a typical spark gap.

FIG. 13 is a partial side view of a second exemplary embodiment of a spark plug according to the present invention, which particularly illustrates an alternative spark gap of nonuniform length produced by grinding the conical insulator tip at an angle.

FIG. 14 is a bottom view of the spark gap plane along the lines C—C in FIG. 12.

DETAILED DESCRIPTION OF THE PREFERRED EMBODIMENTS

Figure 1:
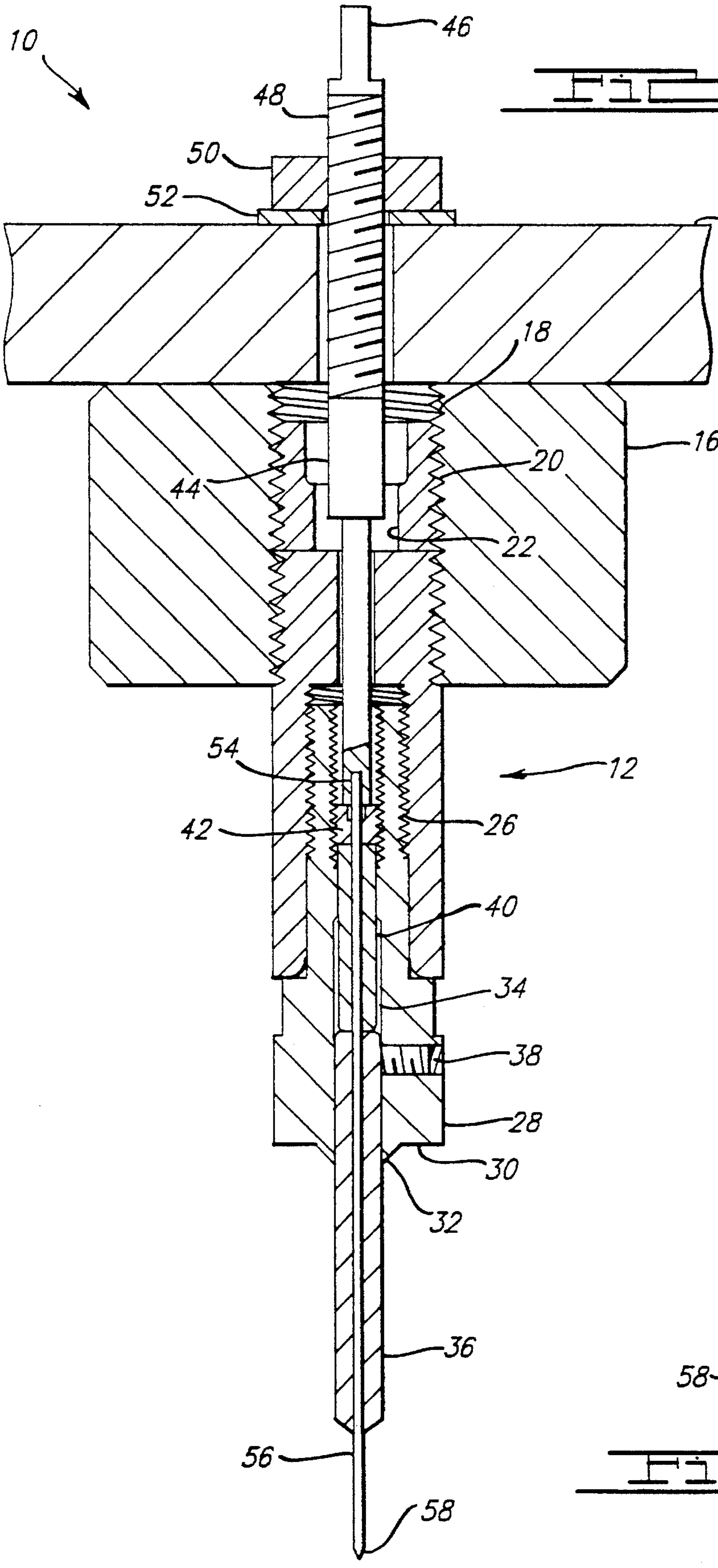
FIG. 1 is a cross-sectional view of the center or high voltage electrode spindle assembly and butt die attached to a press platen for producing a monolithic cermet center electrode spark plug, according to this invention.

In FIG. 1, an apparatus 10 suitable for manufacturing spark plugs according to the present invention is shown. A butt die and spindle assembly 12 of generally circular cross-section is shown attached to an upper press platen 14. Upper press platen 14 is part of a hydraulic press which is not shown. A Carver Laboratory hydraulic press is suitable for producing sample lots. A detail 16 with a generally circular cross-section is attached to platen 14. Detail 16 has a central tapped hole 18. An Allen head lock screw 20 has an axial through clearance hole 22 and is inserted into the tapped hole 18. A butt die support 24 is also screwed into the tapped hole 18. The axial position of butt die support 24 can be adjusted by threading it into tapped hole 18 thereby governing the protrusion of assembly 12 into a mold cavity which will be described below. Butt die support 24 has an axial threaded hole 26 and butt die 28 is threaded into butt die support hole 26. Butt die 28 has a lower surface 30 and an angular filet 32. Lower surface 30 and filet 32 will form the top surface of the spark plug insulator blank, Butt die 28 has an axial hole 34 into which a counterbore spindle 36 is inserted. A set screw 38 is used to retain counterbore spindle 36 into the butt die hole 34. A support pin 40 is also inserted into butt die hole 34 above counterbore spindle 36. An Allen head adjusting screw 42 is also inserted into butt die hole 34 above support pin 40. Adjusting screw 42 may be used to govern the length of protrusion of counterbore spindle 36 below surface 30 of butt die 28 and, in this way, the depth of counterbore spindle 36 in the spark plug insulator may be adjusted.

A center electrode spindle puller 44 is inserted into butt die support 24. Center electrode spindle puller 44 has wrench flats 46 and external threads 48 which are engaged by a nut 50. Nut 50 rests on a flat washer 52 which in turn rests on the upper surface of platen 14. The extreme lower section of spindle puller 44 (shown in section) has an axial hole 54. A center or high voltage electrode spindle 56 is soldered into hole 54 in spindle puller 44. Center electrode spindle 56 may be made of 0.032 inch diameter steel piano wire. Center electrode spindle 56 extends through axial holes in adjusting screw 42, support pin 40 and counterbore spindle 36. Center electrode spindle 56 also protrudes out of the bottom of counterbore spindle 36 and has a conical point 58 at its extreme lower end. All portions of spindle 56 which protrude below counterbore spindle 36 should be highly polished and the corners and point 58 should be slightly radiused as by buffing.

Figure 2:
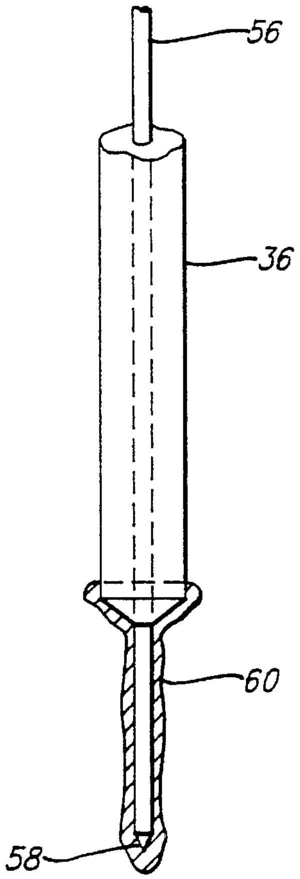
FIG. 2 is an enlarged view of the lower portion of the center electrode spindle assembly with a first coating of cermet ink applied, according to the method of the present invention.

FIG. 2 is an enlarged view of the lower portion of FIG. 1 illustrating a portion of counterbore spindle 36 and also a portion of center electrode spindle 56 and point 58. Shown in cross section is a coating 60 of cermet ink which may be applied by raising a small container of the liquid ink below assembly 12 as it is mounted on press platen 14. As will be appreciated, cermet is one of a group of composite materials comprising an intimate mixture of ceramic and metallic components, usually in the form of powders. For example, one method of preparing a cermet ink in accordance with the present invention has the following constituents:

84% Powdered Tungsten (minus 300 mesh)
15% Alumina (milled A-10)
1% Ethylcellulose dissolved in a minimal quantity of dibutyl carbitol solvent.

To prepare the cermet ink according to this example, the first two dry constituents are thoroughly mixed and processed through a small three-roll ink mill while gradually adding the Ethylcellulose solution a drop at a time over roughly the first twenty minutes of a one-hour milling period. A spatula is used to transfer the ink from beneath the mill and from the lower roller back up to the groove between the two contacting upper rollers which rotate in opposite directions to transfer the ink downward between them to the third contacting roller. An appropriate quantity of solution is used to produce a thick paste during the one-hour period. This paste may then be thinned to a desired viscosity by further solvent additions.

Once the ink has been applied to the center electrode spindle 56, it may be flash dried on the center electrode spindle 56 using infrared lamps. The dried ink layer is adhesively retained on the polished surface of the center electrode spindle 56 by the Ethycellulose binder. The thickness of the ink coating 60 may be adjusted by varying the ink viscosity. The thickness of the ink coating 60 will depend on the desired final diameter of the center electrode in the completed spark plug.

In FIG. 3 the counterbore spindle 36 and center electrode spindle 56 are shown after the addition of a second dipped and dried application of cermet ink which results in a second coating 62 around the point 58 of the spindle. The cermet ink used for the second coating 62 may be identical with the ink used for the first coating 60 with the exception that the tungsten metallic constituent is preferably replaced with platinum. The platinum based second coating 62 will form the sparking surface of the center electrode in the completed spark plug. Thus, the corrosion resistant advantages of having a platinum sparking electrode are achieved while using only a minimum amount of the costly platinum material.

In FIG. 4, butt die 28 is shown inserted into a rubber mold 64. The rubber mold 64 has been filled with a weighed charge of granulated alumina body which will form the insulator blank 66. Substantial hydraulic pressure (e.g., 500 psi) is then applied to the exterior of the rubber mold 64. The inner surface contour of the rubber mold 64 is coincident with the outer contour 64 of the blank 66 and a flared portion 68 is formed at the upper end of the blank 66 where the rubber mold 64 is compressed over the butt die 28. The hydraulic pressure applied has compressed The isulator blank 66 sufficiently to produce a good bond between the exposed surfaces of the first ink coating 60 and the second ink coating 62 and the insulator body 66. This bond between the ink coatings 60 and 62 and the partially compacted ceramic body of the insulator 66 is much stronger than the adhesive bond which initially held the ink coatings 60 and 62 to the polished steel surfaces of the spindles 56 and 36. As a result, when the spindles 56 and 36 are withdrawn from the insulator blank 66, the coatings 60 and 62 will be removed from the spindles 56 and 36 and will remain inside the insulator blank 66.

In FIG. 5 the spindle 56 has been withdrawn upward until point 58 is just within counterbore spindle 36. This may be accomplished by holding wrench flats 46 and turning nut 50 shown in FIG. 1. As the electrode spindle 56 is gradually withdrawn upward, the ink coatings 60 and 62 retain their original axial positions with respect to the partially compacted ceramic body of the blank 66. During the upward motion of spindle 56 the inkcoatings 60 and 62 slide off the surface of the polished point 58 as the hole left below the point is continuously radially collapsed by compressive forces of the maintained hydraulic pressure acting on the rubber mold 64. After the electrode spindle 56 has been withdrawn to the position shown in FIG. 5, the hydraulic pressure is preferably increased significantly (e.g., 3500 psi) to further compact the ceramic body of the blank 66 and the embedded cermet ink coatings 60 and 62. This increase in hydraulic pressure serves to provide a uniform density throughout the structure. The hydraulic pressure acting on mold 64 is now relieved and platen 14 (shown in FIG. 1) is raised. This lifts butt die and spindle assembly 12 upward and out of the rubber mold 62 carrying the still partially compacted insulator blank 66 with it. Set screw 38 is loosened and counterbore spindle 36 carrying blank 66 is removed from butt die 28 and electrode spindle 56.

Figure 6:
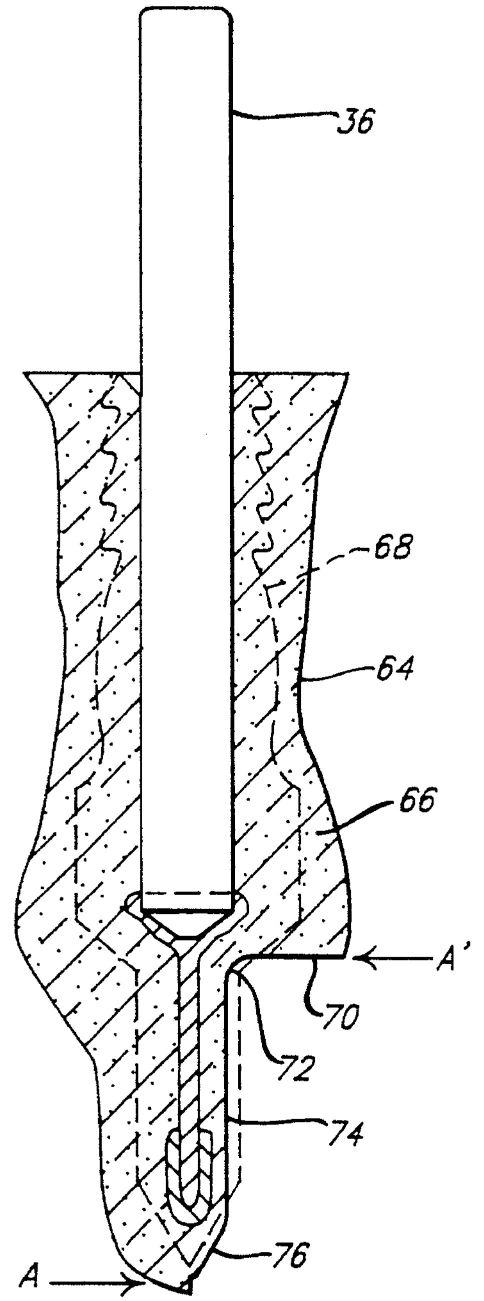
FIG. 6 is a cross-sectional view of the center electrode spindle assembly and ceramic insulator after the ceramic blank has been removed from the molding cavity and a portion of the ceramic blank has been ground away.

In FIG. 6, the blank 66 attached to the counterbore spindle 36 is shown. Dotted line 68 represents the finished grind contour of the spark plug insulator 66 within the present contour 64 of the insulator blank 66. The protruding portion of the counterbore spindle 36 is now placed in the collet of a grinding machine spindle and a contoured grinding wheel makes a plunge cut along contour A—A' shown on the right half only of FIG. 6. Note that contour A—A' intrudes within the dotted finished grind contour 6B. The contour A—A' comprises flat surface 70, radius 72, cylindrical bobbin surface 74 and bullet nose portion 76.

Figure 7:
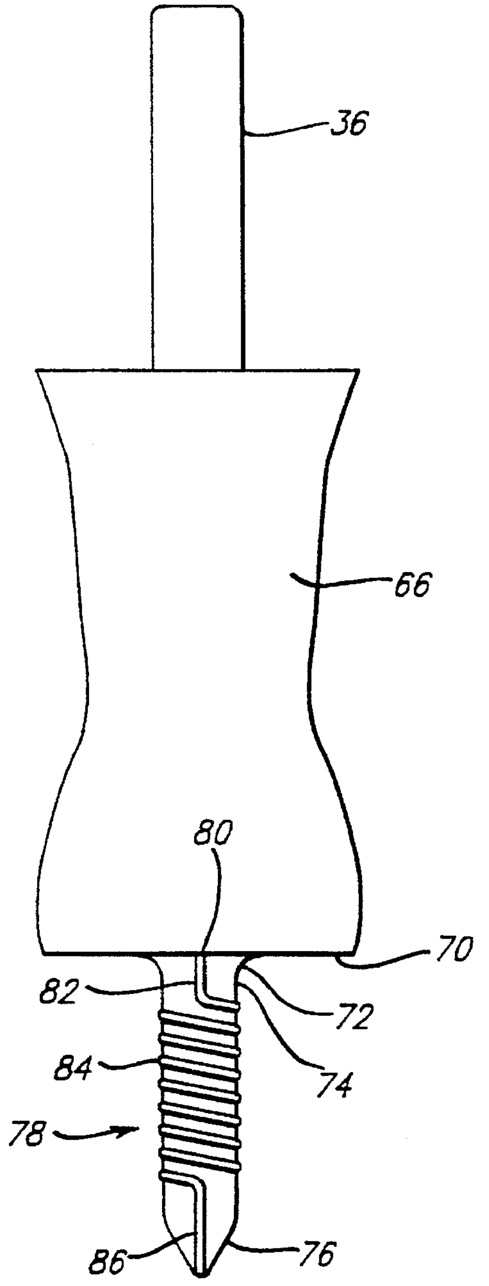
FIG. 7 is a view of the ceramic blank upon which a helical cermet ink pattern has been applied, according to the method of the present invention.

In FIG. 7, the surfaces 70, 72, 74 and 76 formed by the contoured grinding wheel, are shown on both sides of the insulator blank 66. On the lower portion of blank 66, an ink coil pattern 78 of tungsten based cermet ink is applied. This pattern may be applied by a conventional automatically guided ink dispensing gun. This pattern includes horizontal portion 80 running radially across horizontal surface 70 and portion 82 traversing down the surface of radius 72. On the cylindrical bobbin surface 74, the helical ink pattern creates a coil solenoid through the plurality of coil turns 84. From the top of bullet nose 76 a portion of the ink pattern 86 runs vertically down to the tip of the bullet nose 76. The cermet ink which forms helical pattern 78 as it is applied to the blank 66 accretes itself tenaciously to the surface of the insulator blank 66 as the ink solvent is drawn into the still porous ceramic body compact of the insulator blank 66. The ink forming coil pattern 78 may then be dried further using infrared heat lamps. It should be noted that the width of the cermet ink pattern should be sufficient to provide a low resistance path, and that the strength of the magnetic field created by the solenoid will depend upon the number of turns provided in the coil. While it may be possible to create this solenoid using a solid wire, the use of cermet ink forms part of the method according to the present invention.

Figure 8:
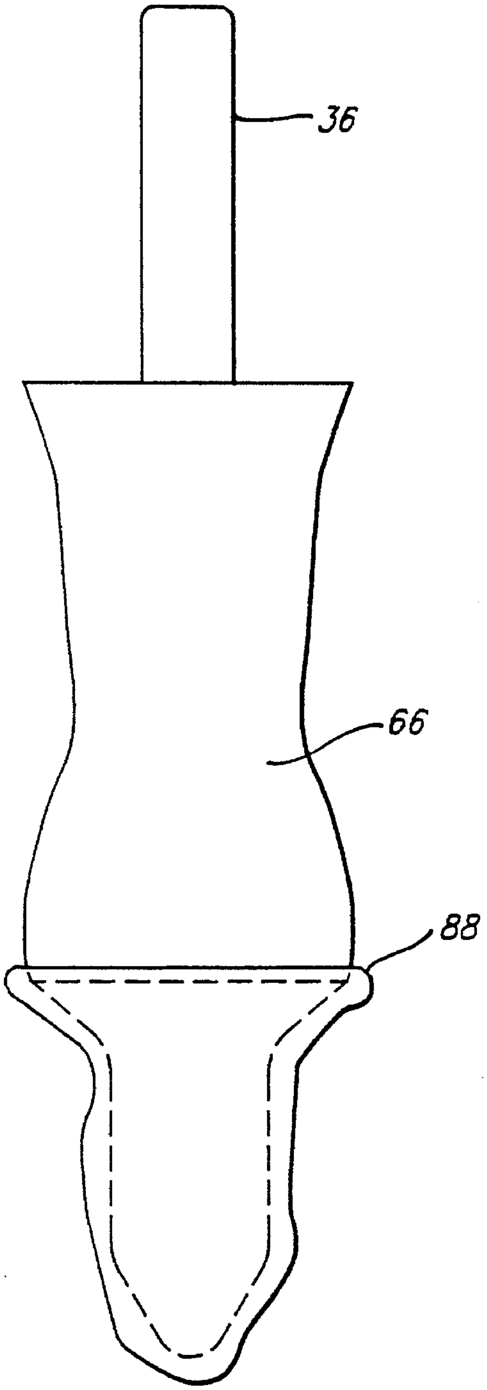
FIG. 8 is a view of the ceramic blank, according to the present invention, following a second pressing operation in which additional ceramic materials has been added to cover the helical pattern of cermet ink.

In FIG. 8, the blank 66 has had additional ceramic body added to cover and enclose the ink coil pattern 78 as shown in FIG. 7, so that the possibility of corrosion is reduced. To accomplish this, a weighed charge of granulated ceramic body is placed centrally in the rubber molding cavity 64. The weight of this second charge is equal to the weight of the material which was removed in the first grinding operation plus a slight additional amount best determined by experiment. As shown in FIG. 8, this second charge should extend above the surface 70. It is important that this second charge be centrally located in the rubber mold cavity. This may be achieved by pouring it in through an axially located funnel. If the charge is not centrally located, the counterbore spindle 36 may be bent during the second pressing, and when the hydraulic pressure is relieved, the spindle 36 may spring back and crack the insulator blank 66.

Next, the insulator blank 66 with coil pattern 78 together with counterbore spindle 36 is replaced into its original position in hole 34 of butt die 28 and set screw 38 is tightened. Platen 14 is then lowered so that the lower end of the insulator blank 66 is thereby immersed in the second charge of granulated ceramic body to a depth which extends slightly above horizontal surface 70. A hydraulic pressure on the order of 4,000 psi is then applied to the exterior of the rubber mold compacting the insulator blank 66 to its final pre-fired density. The hydraulic pressure is relieved, then press opened, set screw 38 loosened and the assembly illustrated in FIG. 8 is removed from the press. There is a slight discontinuity 88 on the surface of insulator blank 66 because of the slight additional weight of the second charge of granulated ceramic body. The upper portion of spindle 36 is placed in the spindle collet of a grinding machine for final grinding.

Figure 9:
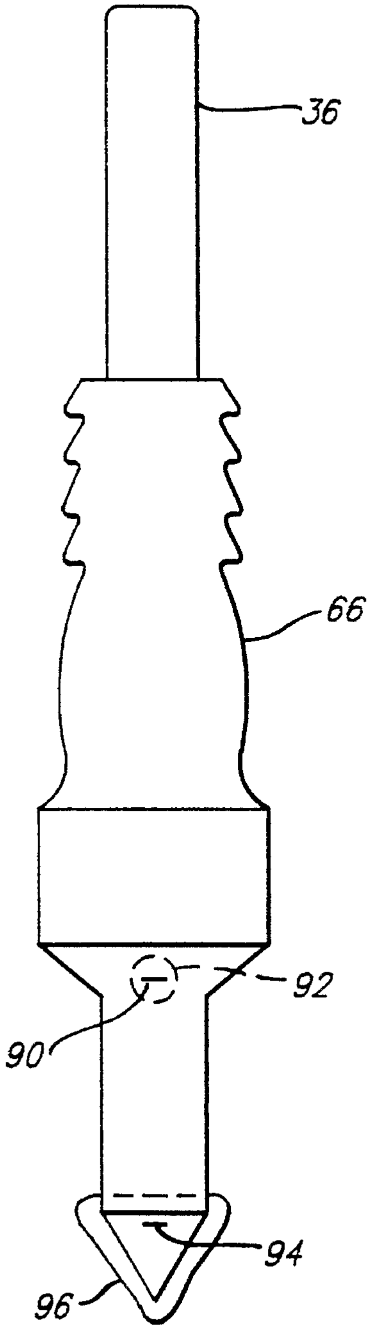
FIG. 9 is a view of the ceramic blank, according to the present invention, following a second grinding operation and additional applications of cermet ink to the grounding portions of the helical pattern of cermet and also to the conical tip of the ceramic insulator.

In FIG. 9, the insulator blank 66 has been ground to its final contour with a plunge cut of a contoured grinding wheel. At location 90 is exposed a section of the ink pattern portion 80. A small dab of tungsten based cermet ink 92 (shown dotted) is placed with a brush or applicator to cover location 90. As will be seen, this dab of ink 92 will serve to assure a more reliable surface for enabling a grounding contact to be made with a lower spark plug gasket. At location 94 a lower section of the ink pattern portion 86 is also exposed around the tip. A tungsten cermet ink coating 96 covering portion 94 is shown in cross section. This coating 96 may be produced by dipping the 60° conical tip of the insulator blank 66 into the cermet ink. Coating 96 makes intimate electrical contact with ink pattern portion 86 at location 94.

The insulator blank 66 may next be removed from counterbore spindle 36. This may be done by twisting the counterbore spindle 36 slightly relative to the insulator blank 66. This shearing action breaks any remaining adhesive bond between the cermet ink coating and the counterbore spindle 36 at the bottom of spindle 36 ensuring that the coating will remain attached to the completed insulator blank 66 when the spindle 36 is withdrawn from the insulator blank 66. The spindle 36 may then be withdrawn from the insulator blank 66.

The insulator blank 66 is now ready for firing (sintering). It will be appreciated that co-firing tungsten and alumina must be accomplished in a chemically reducing atmosphere to prevent oxidation of the tungsten at the high temperatures required to sinter the alumina. This is routinely accomplished using an atmosphere of wet hydrogen in an electrically heated furnace which uses resistance heating elements made of molybdenum. The hydrogen may be obtained by cracking ammonia. A high humidity may be used in the furnace atmosphere to facilitate sintering. Satisfactory results have been achieved utilizing a two-hour firing schedule with a hot zone temperature of approximately 2950° F. If, however, platinum is substituted for tungsten in the cermet ink throughout the spark plug construction, the insulator blank 66 may be fired in a conventional spark plug kiln having an oxidizing atmosphere.

Following firing, the insulator blank 66 butt ends may be stenciled and glazed in a conventional manner. To fire the glaze in a conventional glaze furnace having an oxidizing atmosphere, it has been found that the tungsten exposed on the surface of the insulator blank 66 may be protected from oxidation by covering it with granulated activated charcoal. Thus, when firing the glaze, the insulator tip is buried in the granulated charcoal to cover the ink coatings 92 and 96 shown in FIG. 9. In addition, the insulator blank 66 counterbore may be filled with granulated charcoal. Alternatively, a glaze suitable for firing in a reducing atmosphere may be used. In this case, the glaze may be fired in a reducing atmosphere furnace without further attention to protecting the exposed tungsten.

The next step required to complete the insulator is grinding of the gap plane. To do this, the fired and glazed insulator 66 is pressed vertically on the horizontal surface of a wet diamond metallurgical lap. Material is removed from the angled cone (e.g., 60°) at the insulator tip until the annular gap between the center electrode platinum coating 62 and the ground electrode tungsten coating 96 reaches the desired radial dimension.

Figure 10:
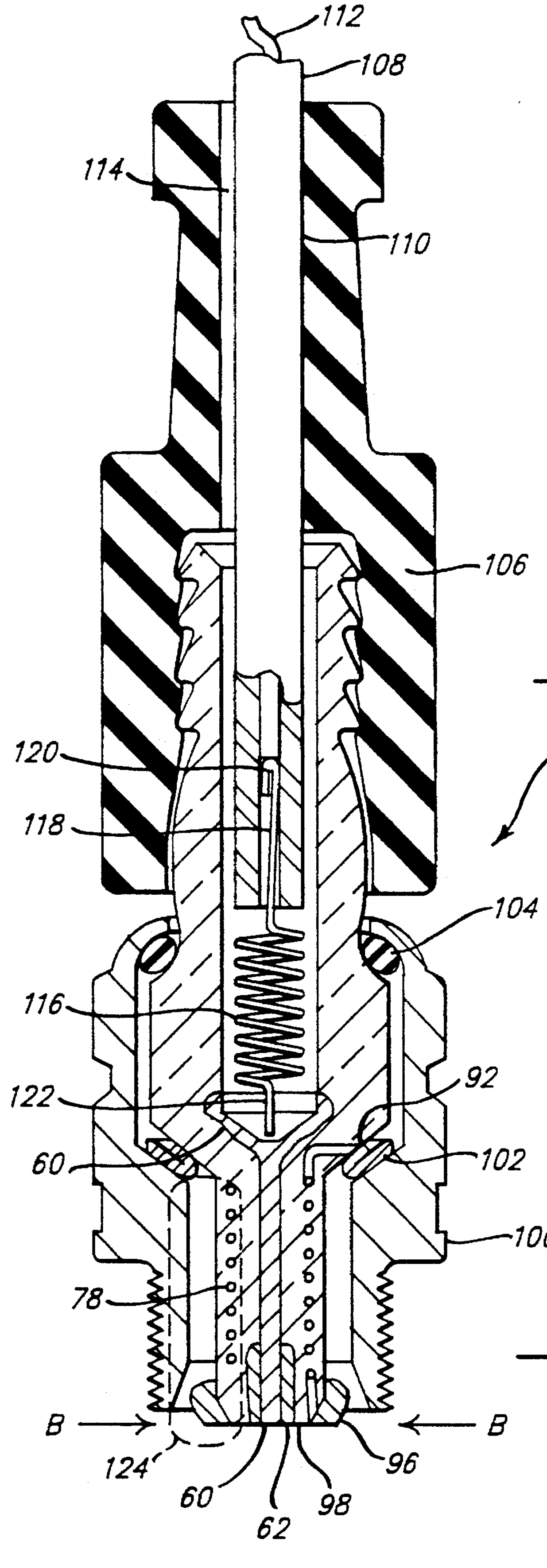
FIG. 10 is a sectional view of the completed spark plug according to the present invention with a spark plug shell, ignition wire and boot attached.

In FIG. 10 the completed spark plug assembly 97 according to this embodiment is shown. The resulting spark gap between the center electrode 62 and the ground electrode 96 is shown in space 98. Because of the 60° conical angle of the ground electrode 96, the spark gap may be easily adjusted by varying the amount of material which is ground from the sintered electrode, the fired insulator 62 and the ground electrode 96 in the gap plane. The gap plane is shown in FIG. 10 as surface B—B.

The completed insulator 66 is next assembled into a steel spark plug shell 100 as shown in FIG. 10. A folded steel bottom gasket 102 makes grounding electrical contact with ink spot 92. The steel spark plug shell 100 is adapted to make grounding electrical contact with the engine in a conventional manner. A metallic top gasket 104 is placed over the insulator 66 and the upper portion of the steel spark plug shell 100 is crimped over the metallic top gasket 104. The steel spark plug shell 100 is then preferably heat shrunk so that the insulator 66 is tightly held between gaskets 102 and 104.

A silicone elastomeric boot 106 is then press fitted over the upper portion of the spark plug insulator 66. A silicone insulated high-voltage ignition wire 108 is also tightly press fitted to the inside diameter 110 of the boot 106. The ignition wire 106 has a conductor 112 at its axial center. Conductor 112 may include conventional electrical elements such as resistance and inductance for suppression of radio frequency emissions. It is preferred that boot 106 includes a groove or channel 114 which serves a function of a ventilation passage as taught in applicant's U.S. Pat. No. 4,514,712, to prevent thermal expansion of gas within the boot 106 and also within the counterbore of the spark plug insulator 66 from causing the boot 106 to move upward on the insulator 66.

In one embodiment of the present invention, a light helical compression spring 116 is positioned within the counterbore of the insulator 66. Spring 116 has an axial tang 118 which terminates in a crook 120 at its upper end in order to be retained in electrical contact with conductor 112. Spring 116 may be pressed into the ignition wire 112 to achieve this electrical contact. Spring 116 also has a lower axial tang 122 which makes electrical contact with tungsten coating 60.

Figure 11:
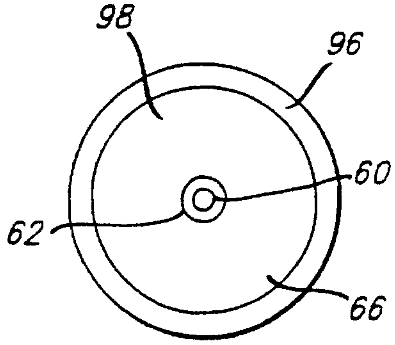
FIG. 11 is an enlarged elevation view of the bottom of the completed spark plug shown in FIG. 10 illustrating the annular spark gap plane indicated at lines B—B in FIG. 10.

In FIG. 10, a typical magnetic line of force is shown at 124. It will be appreciated that the steel shell 100 will cooperate in forming a magnetic circuit for the solenoid 78 to increase the magnetic flux passing through the spark gap 98. A bottom view projection of the spark gap 98, center electrode 62 and ground electrode 96 is shown in FIG. 11. While the cermet coating 96 is preferably continuous, as shown, it may be possible to construct this coating such that it is discontinuous in one or more places.

FIG. 12 illustrates a well-known characteristic typical of spark plug performance. This graph shows the nonlinear impedance characteristic of spark gap breakdown. The relevant feature is that although a relatively higher voltage is necessary to cause initial breakdown of a spark gap, once an arc has been established a considerably smaller voltage will suffice to sustain the arc at increasing current flow rates. This characteristic is utilized in another embodiment of the present invention which is shown in FIG. 13.

FIG. 13 shows an enlarged view of the bottom end of the spark plug insulator 66 which has its gap plane ground at an angle shown as plane C—C. The ground electrode cermet coating 96 is also shown. In FIG. 14, a projected view of the gap plane is shown. It can be seen in FIG. 14 that the sparking edge 126 of the ground electrode 96 is elliptical in the gap plane. Also, the center electrode sparking edge 62 is on the major axis of the ellipse formed by ground electrode sparking edge 126, but is not centered so that the annular gap between the sparking surface of the ground electrode 126 and the sparking edge of the center electrode 62 is not of uniform length. Consequently, when voltage is applied to the center electrode 60, the initial spark will jump the shortest distance across the annular gap 128. This will likely occur at the right hand side of gap 128 in FIG. 14. The magnetic field induced by solenoid 78 will cause the spark to rotate about the center electrode 60 to an area where the annular gap 128 is longer. Due to the nonlinear impedance characteristic of a spark gap as indicated in FIG. 12, a lower sustaining voltage is able to maintain an arc once the arc is established. This permits continued current flow with a constant or decreasing sparking voltage as the arc is magnetically swept to an area where the annular gap 128 is longer. Additionally, it should be noted that the gap plane surface shown in FIGS. 13 and 14 need not necessarily be flat, as it is possible to provide any surface shape that be desirable in the appropriate application.

Figure 15:
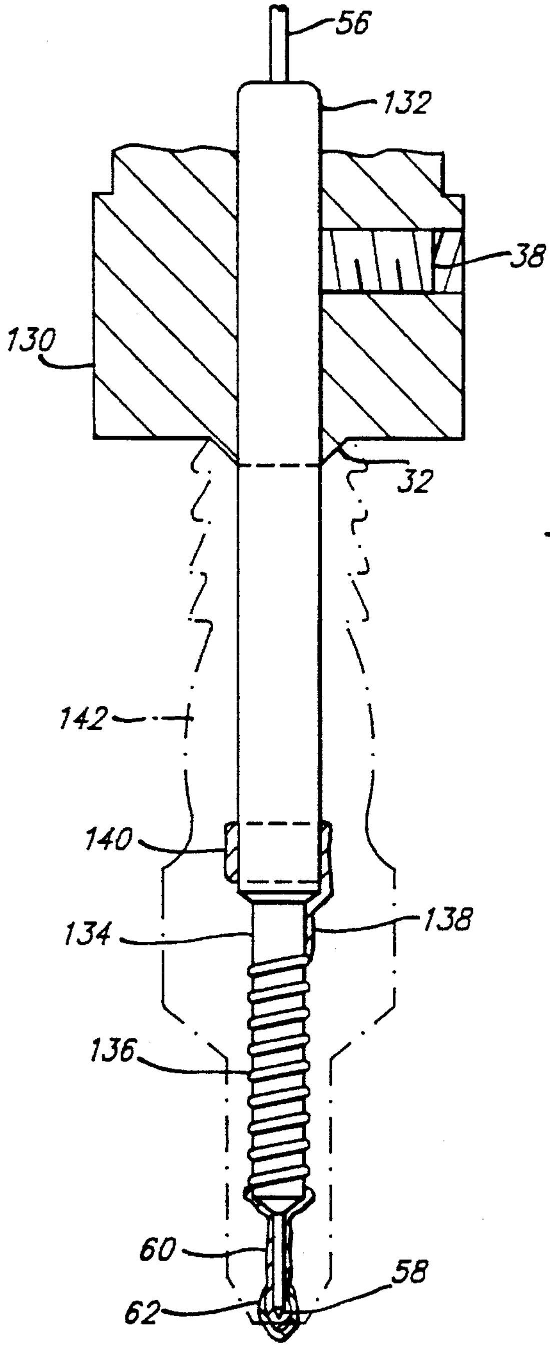
FIG. 15 is a side view, partially in cross-section of a third exemplary embodiment of a spark plug insulator according to the present invention showing the lower end of a butt die and center electrode spindle assembly with a cermet ink coating forming a helical pattern or coil around a counterbore portion of the spindle.

In FIG. 15, fabrication of another exemplary embodiment of a spark plug according to the present invention is illustrated. As with each of the various embodiments described, identical reference numbers will be used for components when corresponding to those discussed in connection with the embodiment of FIGS. 1–11. However, new reference numbers will be used for additional components, or for components which substantively differ from those discussed in connection with FIGS. 1–11.

A butt die 130 is shown which is similar to the butt die 28 illustrated in FIG. 1. Butt die 130 incorporates a tapped hole containing a set screw 38. A counterbore spindle 132 is similar to counterbore spindle 36 in FIG. 1. But is longer in length and has a step-down or reduced diameter portion 134. Electrode spindle 56 is the same as the spindle 56 shown in FIG. 1. A tungsten cermet ink coating 60 and a platinum cermet ink coating 62 are similar to those shown in FIG. 3. The helical tungsten ink pattern comprising turns 136 is applied to diameter 134 of counterbore spindle 132. The bottom turn of the helical pattern 136 is positioned to contact ink portion 60. The upper turn of helical ink pattern 1.36 is contacted by short vertical stripe portion of tungsten ink 138 which serves to connect helical pattern 136 to a counterbore contact collar tungsten ink portion 140.

As described previously with respect to FIG. 4, the assembly in FIG. 15 is placed into a weighed charge of granulated ceramic body which has been loaded into a rubber mold 64. A hydraulic pressure of approximately 500 psi is applied to the rubber mold 64. The electrode spindle 56 is then withdrawn until the tip 58 is just within the counterbore spindle 132. A final hydraulic pressure of approximately 4000 psi is applied to the rubber mold 64, the hydraulic pressure is relieved, the press is opened, set screw 38 is loosened and the compacted insulator blank 142 is removed from butt die 130 and electrode spindle 56. The protruding portion of counterbore spindle 132 is placed in the collet of a grinding machine where a plunge cut of a grinding wheel shapes the outside of the insulator blank 142 to its final contour.

Figure 17:
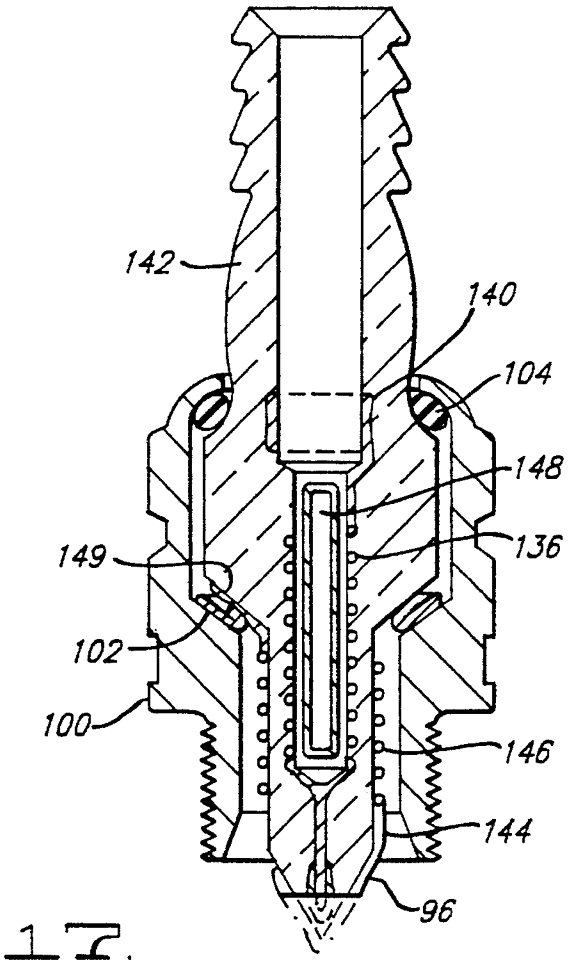
FIG. 17 is a cross-sectional view of a complete spark plug assembly according to the third exemplary embodiment of the present invention.

FIG. 17 shows the insulator 142 with additional applications of tungsten cermet ink made to the chalk of "green" stage insulator 142 as follows. Coating 96 (partially shown dotted) is applied by dipping as described in connection with FIG. 9. An automatic ink gun is used to apply connecting portion 144. A helical coil comprising windings 146 and stripe portion 149 is applied. Stripe portion 149 will be used to make grounding contact with bottom gasket 102 as shown in FIG. 10. Note that since the helical turns 136 are right hand, the helical turns 146 must be left hand in order for the magnetic fields created to add or aid each other. The green insulator 142 bearing its internal and external ink patterns is now fired (sintered) in wet hydrogen and the butt portion is glazed as described previously. In FIG. 17, the dotted portion of the ground electrode 96 is ground off on a diamond lap to form a spark gap as previously described in connection with FIG. 10.

Figure 16:
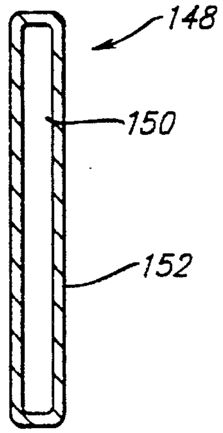
FIG. 16 is a cross-sectional view of an insulated magnetic core for use with the third exemplary embodiment of the present invention.

In FIG. 16, an insulated magnetic core 148 is shown. Magnetic core 148 may comprise a cylindrical soft ferrite rod 150 to which a heavy overcoating of electrically insulating ceramic glaze 152 has been applied. It is important that the thermal coefficient of expansion of the glaze match that of the ferrite so that temperature changes do not crack the ferrite or the glaze. Desirable characteristics for the ferrite 150 include both high permeability and high curie point. Insulated magnetic core 148 will be inserted into the insulator 142 within the coil windings 136. To provide additional insulation of the coil turns 136 from the ferrite 150, it may be desirable to glaze that portion of the interior of the insulator counterbore formed by spindle diameter 134. Alternatively, a high-temperature silicone or organic coating may be used. Before insulated magnetic core 148 is inserted into the insulator 142, a measured quantity of a high temperature semi-solid silicone grease (not illustrated) is preferably placed at the bottom of the insulator counterbore which was formed by counterbore spindle diameter 134. This grease may include powdered alumina in order to increase its thermal conductivity. Magnetic core 148 is then inserted downward into the counterbore as shown in FIG. 17, the measured quantity of grease should be sufficient to fit the space within the lower insulator counterbore remaining when the magnetic core 148 is in position. It may be desirable to heat the insulator tip in order to reduce the grease viscosity and apply a vacuum to remove any entrapped air. This is because the dielectric strength of solid insulating materials is known to be improved by the absence of air.

The completed insulator 142 is now installed in a spark plug shell 100 with gaskets 102 and 104 as previously described in connection with FIG. 10. Note that in FIG. 17, the coil windings 146 are left exposed. This is in contrast to the previous embodiment shown in FIG. 10 where the corresponding coil windings 78 were coated with ceramic material. Because of this, it is important that there be sufficient clearance between the turns 146 and the inside of the spark shell 100 to prevent flashover. The high voltage electrical connection may then be made at the inner surface of 140.

It will be appreciated that coil windings 136 perform a function to increase magnetic field strength at the gap plane. Windings 136 are in close proximity to the spark gap 98 and thus provide a stronger magnetic field. While the windings 136 and 146 are cylindrical, it should be appreciated that other suitable shapes or patterns could be employed in the appropriate application. In addition, it will be appreciated that insulated magnetic core 148 inserted into coil windings 136 will have the effect of further increasing the intensity of the magnetic field acting upon the spark across gap 98. While the magnetic core 148 could lose its magnetism when the surrounding temperature exceeds the curie point of the core, the provision of a magnetic core will be most effective in a cold engine.

Figure 18:
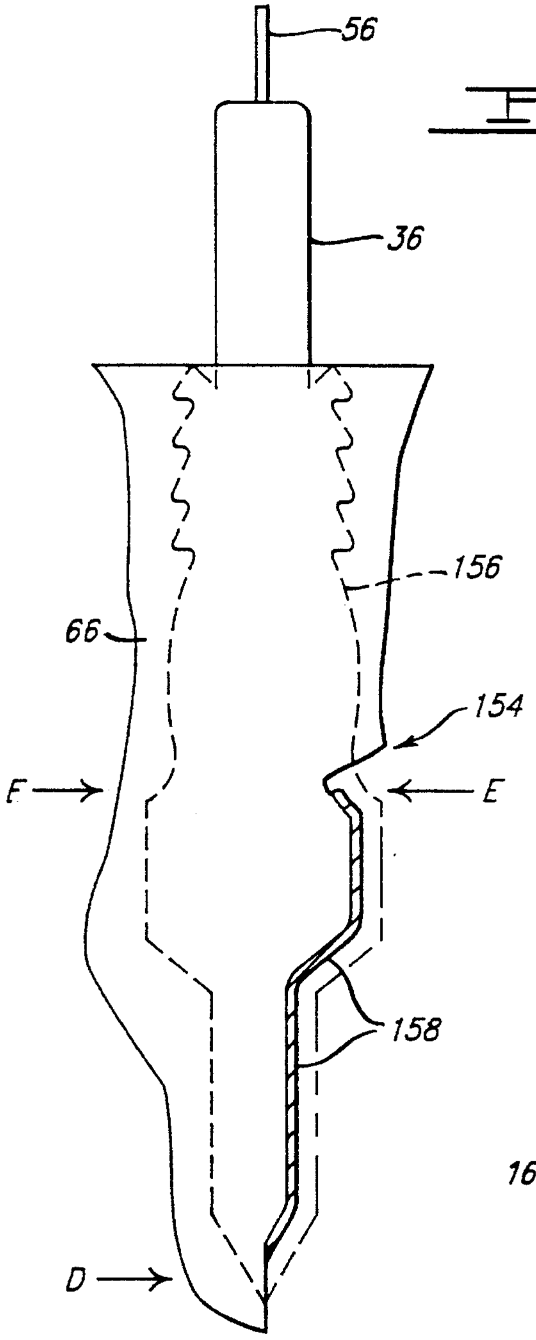
FIG. 18 is a side view of a fourth exemplary embodiment of a spark plug according to the present invention showing a cermet coating on the ceramic insulator forming a capacitor plate.

In FIG. 18, yet another exemplary embodiment of a spark plug according to the present invention is shown. This embodiment incorporates a capacitor which is electrically connected between the spark plug center electrode and ground. A different arrangement, using a 175 picofarad capacitor external to the spark plug, is described in Society of Automotive Engineers Paper 850076, where it is called a "blast wave" ignition system. The effect of the capacitor in such a system is to increase the intensity of the initial spark discharge. This increased initial intensity is believed to produce a larger initial flame kernel. The energy stored in the capacitor is, of course, a function of the sparking voltage, since, when the spark plug gap breaks down, the capacitor commences to discharge. In the present embodiment, the closer physical proximity of the capacitor to the spark plug gap increases the speed of its discharge and improves the functioning of such a blast wave ignition system.

In FIG. 18, counterbore spindle 36 and electrode spindle 56 are prepared as previously described in connection with FIG. 2. The spindle 36 and butt die assembly 28 are inserted into a weighed charge of granulated ceramic body located in a rubber mold 64, 500 psi hydraulic pressure is applied to the mold 64, the electrode spindle 56 is withdrawn, as previously described, to form The center electrode. In this embodiment, however, at this stage the center electrode comprises only tungsten ink and hydraulic pressure is increased to approximately 3500 psi. Hydraulic pressure is then relieved, the press is opened and the insulator compact 66 is removed from the mold 64. Set screw 38 is loosened and the insulator compact 66 and counterbore spindle 36 are removed from butt die 28 and electrode spindle 56. The protruding portion of the counterbore spindle 36 is placed in the collet of a grinder and the first grind contour 154 (illustrated only on the right side of FIG. 18) is ground by a pie cut of a contoured grinding wheel. Note that the final ground contour 156 is shown dotted and that the first grind contour 154 intrudes into the final grind contour 156. Tungsten cermet ink is then sprayed around the insulator blank 66 entirely covering the lower portion of the first grind contour below the level indicated by arrows E—E. This forms a high voltage capacitor plate surface 158 which, although illustrated only on the right half of FIG. 18, encases the entire portion of the insulator blank 66 at this stage.

Figure 19:
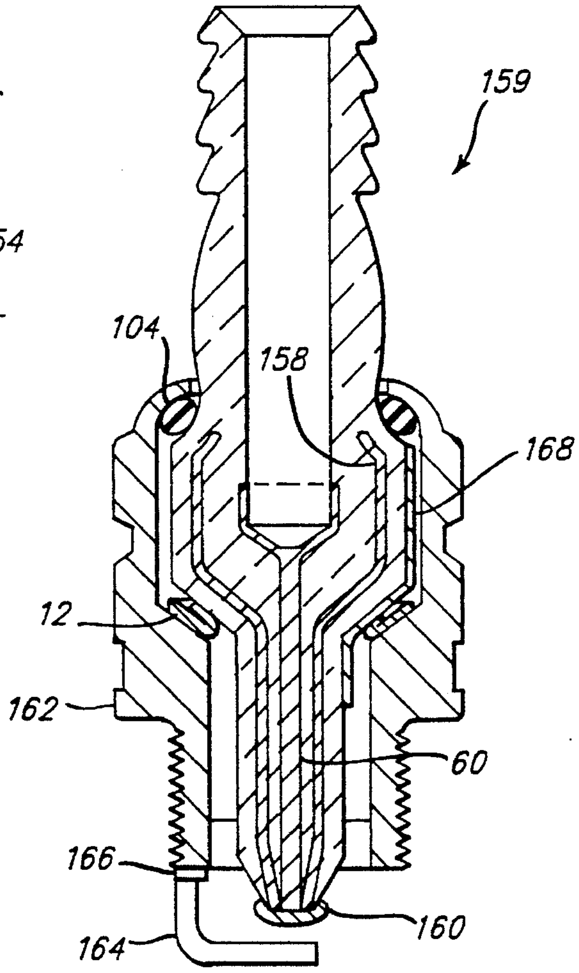
FIG. 19 is a cross-sectional view of a completed spark plug according to the fourth exemplary embodiment of the present invention showing a second cermet coating forming a second capacitor plate.

The completed spark plug 159 is shown in FIG. 19. The high voltage capacitor plate 158 must be covered with a dielectric layer of additional ceramic body. To do this, the procedure is similar to that described in connection with FIG. 8. Following application of the final high (e.g., 4000 psi) hydraulic pressure, the insulator blank 66 and spindle 36 are removed from the press, the final contour 68 is ground and the completed green (unfired) insulator is removed from spindle 36 as previously described. At this stage, depending on the precision with which dimensional tolerances may be held, the lower end of center electrode 60 may or may not be in contact with the lower end of capacitor plate surface 158. In any event, both will be exposed at the lower tip of the green insulator blank 66. A dab of platinum based cermet ink 160 is placed over the lower tip of the insulator blank 66. This platinum ink coating 160 ensures electrical connection between center electrode 60 and plate surface 158 and also forms the center electrode sparking surface. The insulator 66 is now fired, glazed and assembled into a spark plug shell 162 with gaskets 102 and 104. Shell 162 is the same as shell 100 except that shell 162 bears a conventional "J" type ground electrode 164, butt welded to its lower surface at point 166.

In operation, the capacitor comprises high voltage capacitor plate surface 158 and the grounded surface consisting of the adjoining inner surfaces of the spark plug shell 162 and the gaskets 102 and 104. The capacitor dielectric is the ceramic and the gases between these two surfaces. This capacitor dielectric must be of sufficient thickness and dielectric strength to resist breakdown at the maximum voltage capability of the ignition system which may be connected to the spark plug.

An optional grounded surface 168 is shown in FIG. 19. This grounded surface 168 places the grounded surface in closer proximity to the high voltage capacitor plate surface 158. Closer proximity provides an increase in capacitance over that provided when the more remote inner surface of the spark plug shell 162 is used as the grounded surface. Surface 168 wraps around the entire insulator and covers a length from the top of the insulator shoulder to about half way down the insulator tip as shown. Surface 168 may be applied by spraying tungsten cermet ink onto the spark plug insulator 66 in the green stage. In the completed spark plug, surface 168 is electrically grounded by its contact with gasket 102. It should be noted that FIG. 19 depicts one embodiment of the present invention with an integral capacitor using a conventional spark plug ground electrode. However, the capacitor shown in FIG. 19 can also be utilized with the annular type ground electrode as shown in FIGS. 1 through 8.

In FIGS. 20–23, another exemplary embodiment of a spark plug insulator 170, according to the present invention, is illustrated. The spark plug insulator 170 of FIGS. 20–23 is similar to the spark plug insulator of FIG. 17 in that it has a solenoid coil connected to the center electrode with a magnetic core inserted inside this coil. The embodiment in FIGS. 20–23, however, provides an alternative means for electrically insulating the coil in the spark plug tip from the magnetic core.

Figure 20:
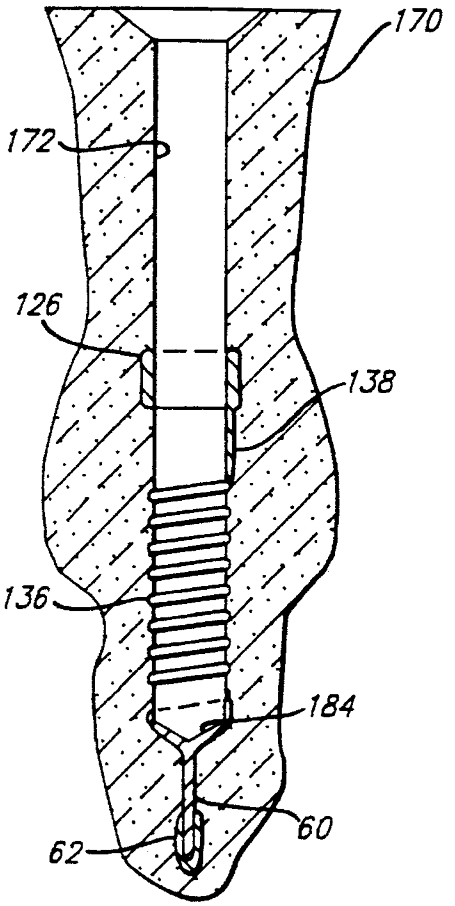
FIG. 20 is a cross-sectional view of a fifth exemplary embodiment of a spark plug according to the present invention, which shows the partially pressed insulator blank.

In FIG. 20, a spark plug insulator blank 170 is shown which has been formed in an isostatic rubber mold in a manner similar to the one shown in FIG. 15. In brief, conductive ink coatings have been applied to a counterbore spindle 132 as shown in FIG. 15 and an insulator charge has been compressed around the spindle in an isostatic rubber mold. After the spindle has been removed, the conductive coating remains within the insulator 170. In particular, the central electrode 60 with a coating 62, conical portion 184, coil windings 136, vertical stripe 138 and a contact sleeve 126 are each found within the insulator blank 170. The removal of the counterbore spindle 132 has left the counterbore opening 172 in the insulator 170. The insulator 170 has been pressed once at 500 psi before the electrode spindle is removed. Then a pressure of approximately 3500 psi is applied. The pressure is relieved and the counterbore spindle 132 and insulator 120 are removed from the mold. The counterbore spindle 132 is then removed from the insulator 170. The above procedure results in the insulator 170 shown in FIG. 20.

Figure 21:
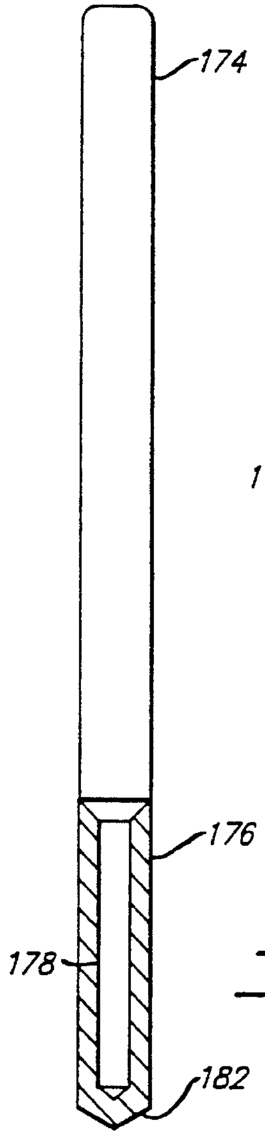
FIG. 21 is a view of a counterbore spindle with a preformed ceramic portion for insertion into the insulator blank shown in FIG. 20.

In FIG. 21, there is shown a solid spindle 174 having a major diameter with precisely the diameter of the spindle used to form the counterbore diameter 172 in FIG. 20. At the lower end of the spindle 174 is a reduced diameter portion 178. A preform sleeve 176 has been formed around the reduced diameter portion 178. The preform sleeve 176 is made of alumina insulator body that has been isostatically pressed around the spindle portion 178 and ground to the major diameter of the spindle 174. The preform sleeve 176 has a conical tip 182 that matches precisely a conical bottom portion 184 of the counterbore spindle 172, shown in FIG. 20.

Figure 22:
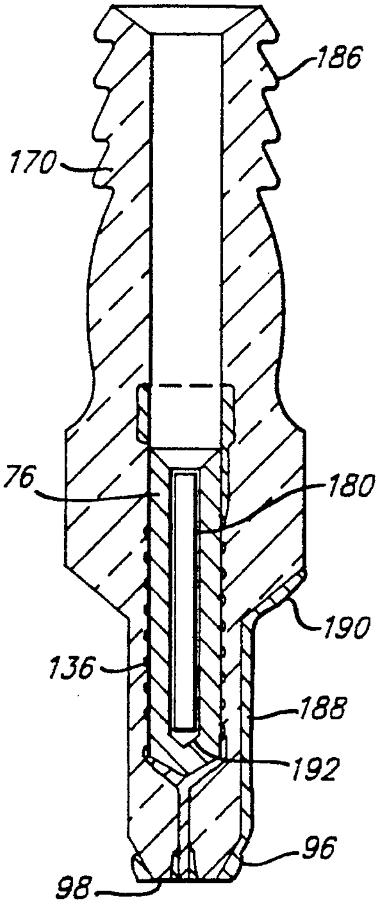
FIG. 22 is a cross-sectional view of a completed insulator with the insert carried by the spindle shown in FIG. 21 inserted.

The insulator blank 170 in FIG. 20 is placed on the spindle 174 and sleeve 176 in FIG. 21, so that the spindle conical surface 182 and the insulator blank conical surface 184 are in contact. The upper protruding portion of the spindle 174 is placed in a butt die and the assembly reinserted into the rubber mold originally used to form the insulator blank 170. A third pressure of approximately 4000 psi is applied which adheres and integrates the material of the sleeve 176 with the insulator blank 170. The 4000 psi pressure is relieved, the press opened and the spindle 174 bearing the assembled blank 170 and the sleeve 176 are removed from the butt die. The protruding upper end of the spindle 174 is placed in the collet of the grinding machine and the insulator blank 170 is ground to its final external contour 186 as shown in FIG. 22.

When the preform sleeve 176 is initially formed on the spindle 174, it is important in order to avoid warping or separation during subsequent sintering, that the pressed density of the sleeve 176 match the pressed density of the material of the insulator blank 170 in the lower region of the counterbore 172 where the sleeve 176 is to be assembled. For example, as will be appreciated, if the blank 170 is pressed to 3500 psi, a somewhat lesser pressure will produce a comparable pressed density in the smaller section of the sleeve 176. The initial pressing pressure for the sleeve 176 is best determined experimentally.

The ground insulator blank 170 having contours 186 is removed from the spindle 174. The conical tip of the insulator blank 170 is dipped in tungsten ink to form a ground electrode 96. A narrow ribbon of conductive ink 188 is painted up the insulator tip and across the insulator seat where it will make grounding contact with the bottom spark plug gasket 190. As an alternative to the stripe 188, a helical ink pattern such as the turns 146 of FIG. 16 may be employed. These additional ink coatings are dried and the complete insulator blank 170 is sintered in a reducing atmosphere.

Figure 23:
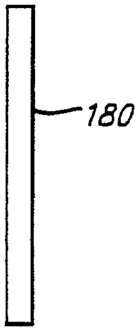
FIG. 23 is a side elevation view of a magnetic core which is inserted into the insulator shown in FIG. 22.

The insulator butt is stenciled and glazed and the conical insulator tip is ground to form the annular gap 98. FIG. 23 illustrates a cylindrical magnetic core 180 which is preferably of a high permeability, high curie point ferrite. This magnetic core 180 serves a similar function as the magnetic core 148 shown in FIG. 16. However, while the magnetic core 148 in FIG. 16 required an insulating glaze 152, the magnetic core 180 is uninsulated. The sleeve 176 serves to insulate the magnetic core 180 from the solenoid or coil 136. The magnetic core 180 is inserted into the sleeve 176 portion of the completed insulator and a small quantity of silicon grease (not shown) is placed in the bottom of the sleeve insulator portion at location 192. Note that a longer portion of the core 180 protrudes from the top of the coil 136 than from the bottom of coil 136. Because of this, the magnetic centering force due to the coil 136 on the core 180 will tend to keep the core 180 seated down in the insulator 170. The completed insulator and core assembly shown in FIG. 22 may then be conventionally assembled in a steel spark plug shell 100 as shown in FIG. 17.

It should also be appreciated that a circuit containing both inductance and capacitance can be integrally constructed according to the teachings of this invention which, in conjunction with the spark gap, may form an oscillator. An oscillation in such a circuit, which includes the spark gap, may be sustained by providing ignition voltage at the natural frequency of the oscillator or at a harmonic frequency. In other words, an integral spark plug circuit formed by the capacitor, inductor and spark gap in accordance with the present invention can be made to resonate.

While it will be apparent that the teachings herein are well calculated to teach one skilled in the art the method of making preferred embodiments of this invention, it will be appreciated that the invention is susceptible to modification, variation and change without departing from the proper scope and meaning of the subjoined claims.

What is claimed is:

1. A method of forming an electrically conductive coil within the insulator of a spark plug which is capable of inducing an electromagnetic field, comprising the steps of:

forming an insulator blank of compacted ceramic material;

depositing a coil forming material having an electrically conductive constituent suspended in a fluid onto said insulator blank in a predetermined coil pattern;

covering said deposited coil forming material with additional ceramic insulating material; and co-firing said insulator blank with said deposited coil forming material covered with said additional ceramic insulating material.

2. The method according to claim 1, wherein said covering step includes the step of compacting said additional ceramic material at a pressure which is greater than the pressure used to compact said insulator blank ceramic material.

3. The method according to claim 1, wherein said depositing step includes the step of drying said coil forming material.

4. The method according to claim 3, wherein said coil forming material is a cermet ink.

5. The method according to claim 4, wherein said predetermined coil pattern is a helical coil pattern having a plurality of turns.

6. A method of forming a spark plug, comprising the steps of:

forming a high voltage electrode within a first compact of ceramic insulator material;

forming a coil on the surface of said first compact;

forming a ground electrode onto a tip of said first compact such that said ground electrode is connected to one end of said coil;

both said coil and said ground electrode being formed by applying a cermet ink to said ceramic insulator material, said cermet ink having a conductive constituent and a ceramic constituent;

covering said coil with additional ceramic insulating material; and co-firing said first compact with said electrodes, said coil and said additional ceramic insulating material.

7. The method according to claim 6, wherein said tip of said first compact has a generally conical shape, and said method includes the step of changing a dimension of said tip to provide a desired gap between said high voltage electrode and said ground electrode.

8. The method according to claim 6, wherein said high voltage electrode, said coil and said ground electrode are all formed from a fluid material having an electrically conductive constituent and a ceramic constituent.

9. The method according to claim 8, wherein said fluid material is a cermet ink.

10. A method for fabricating a precious metal center electrode in an isostatically pressed spark plug insulator blank comprising the steps of:

coating an electrode spindle with a base metal cermet ink, drying said ink to form a first coating, overcoating a small portion of said first coating with a precious metal cermet ink, drying said precious metal ink to form a second coating, placing said spindle into an isostatic mold which contains a charge of ceramic insulator body, applying pressure to said mold, and withdrawing said spindle from said mold leaving said first coating and said second coating in place in said ceramic body and at least partially surrounded and enclosed by said body.

11. A method for forming a capacitor plate surface within the ceramic insulator of a spark plug comprising the steps of:

filling an isostatic rubber molding cavity with a first measured charge of ceramic insulating material, applying a first hydraulic pressure to the exterior of said molding cavity to form a first compact and relieving said first pressure, coating a portion of the resulting green ceramic compact with a cermet ink, filling an isostatic rubber molding cavity with a second measured charge of ceramic insulating material, inserting said compact into said second charge and applying a second hydraulic pressure to said second charge and said compact to form a second compact and relieving said second pressure.

12. The method of claim 11 additionally comprising the step of applying a second electrically conductive capacitor plate surface to said second compact.

13. The method of claim 11, wherein said second hydraulic pressure is greater than said first hydraulic pressure.

14. The method of claim 11, wherein material is removed from said first compact and said second compact to achieve a predetermined shape.

15. The method of claim 12, wherein material is removed from said first compact and said second compact to achieve a predetermined shape.

* * * * *